United States Patent
Kuo

(10) Patent No.: US 6,386,562 B1
(45) Date of Patent: May 14, 2002

(54) SCOOTER HAVING CHANGEABLE STEERING MECHANISM

(76) Inventor: Hui Shan Kuo, No. 19, Lane 640, Gien Gong Road, San Min Chu, Kaohsiung (TW), 807

( * ) Notice: Subject to any disclaimer, the term of this patent is extended or adjusted under 35 U.S.C. 154(b) by 0 days.

(21) Appl. No.: 09/659,052

(22) Filed: Sep. 11, 2000

(51) Int. Cl.[7] .................................................. B60G 1/00
(52) U.S. Cl. ................................................. 280/87.042
(58) Field of Search ........................ 280/14.28, 87.042, 280/87.041, 11.2, 87.01, 87.021, 87.043, 87.05, 11.27; D21/771

(56) References Cited

U.S. PATENT DOCUMENTS

| | | | | |
|---|---|---|---|---|
| 2,051,762 A | * | 8/1936 | Vincent ................. | 280/87.041 |
| 4,133,548 A | * | 1/1979 | Smith .................... | 280/87.041 |
| 4,795,181 A | * | 1/1989 | Armstrong ............ | 280/87.042 |
| 5,090,716 A | * | 2/1992 | Borden .................. | 280/87.042 |
| 5,417,444 A | * | 5/1995 | Chen ..................... | 280/87.042 |
| 5,927,733 A | * | 7/1999 | Banda ................... | 280/87.041 |
| 5,927,734 A | * | 7/1999 | Horton, II et al. ..... | 280/87.042 |
| 6,139,035 A | * | 10/2000 | Tsai ....................... | 280/87.041 |
| 6,234,501 B1 | * | 5/2001 | Chen ..................... | 280/87.041 |
| 6,270,095 B1 | * | 8/2001 | Chang ................... | 280/87.041 |

* cited by examiner

Primary Examiner—Christopher P. Schwartz
Assistant Examiner—Melanie Torres
(74) Attorney, Agent, or Firm—Charles E. Baxley

(57) ABSTRACT

A scooter includes a board device having a front board and having one or more wheels attached to the rear portion, and a rear board extended rearwardly and upwardly from the front board and having one or more wheels attached to the rear portion. A handle is rotatably secured to the front board has one or more front wheels for steering purposes. The rear wheels may be spaced from the ground when the front wheel is engaged with the ground, and the front wheel may be spaced from the ground when the rear wheel is engaged with the ground.

5 Claims, 6 Drawing Sheets

SCOOTER HAVING CHANGEABLE STEERING MECHANISM

BACKGROUND OF THE INVENTION

1. Field of the Invention

The present invention relates to a scooter, and more particularly to a scooter having a changeable steering mechanism.

2. Description of the Prior Art

Typical scooters comprise a board having one or more wheels attached to the front portion and one or more wheels attached to the rear portion thereof, and a handle stem extended upward from the front portion of the board. The front wheels may be attached to the bottom of the handle stem and to be rotated by the handle stem. The rear wheels may not be rotated for steering purposes.

The present invention has arisen to mitigate and/or obviate the afore-described disadvantages of the conventional scooters.

SUMMARY OF THE INVENTION

The primary objective of the present invention is to provide a scooter including a changeable steering mechanism for selectively controlling the steering of the scooter with a rotatable front wheel or a rotatable rear wheel.

The other objective of the present invention is to provide a scooter including a rear wheel that may be rotated with the handle device for steering purposes.

In accordance with one aspect of the invention, there is provided a scooter comprising a supporting board device including a first board including a front portion and including a rear portion, at least one first wheel attached to the rear portion of the first board for engaging with a supporting surface, a second board extended rearwardly from the rear portion of the first board and inclined upwardly from the first board, the second board including a rear portion, at least one second wheel attached to the rear portion of the second board for engaging with the supporting surface, a handle device rotatably secured to the front portion of the first board and including a lower portion, and at least one third wheel attached to the lower portion of the handle device and to be rotated by the handle device for engaging with the supporting surface and for steering purposes. The second wheel may be elevated and spaced from the supporting surface when the third wheel is engaged with the supporting surface, and the third wheel may be elevated and spaced from the supporting surface when the second wheel is engaged with the supporting surface.

The first board includes a barrel secured to the front portion thereof, the handle device includes a tube rotatably secured in the barrel, the tube includes a lower portion having the third wheel attached thereto. The handle device includes at least one extension foldably received in the tube, and a handle secured on top of the extension.

The third wheel is rotatably secured to the second board with a pivot shaft, the scooter further includes means for rotating the third wheel about the pivot shaft. The rotating means includes a coupler rotatably secured to the second board with the pivot shaft, and means for coupling the handle device to the coupler and to rotate the third wheel about the pivot shaft.

The coupling means includes at least one cable coupled between the coupler and the lower portion of the handle device. The coupling means includes a pulley secured to the lower portion of the handle device, the cable includes a first end secured to the coupler and includes a second end secured to the pulley.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
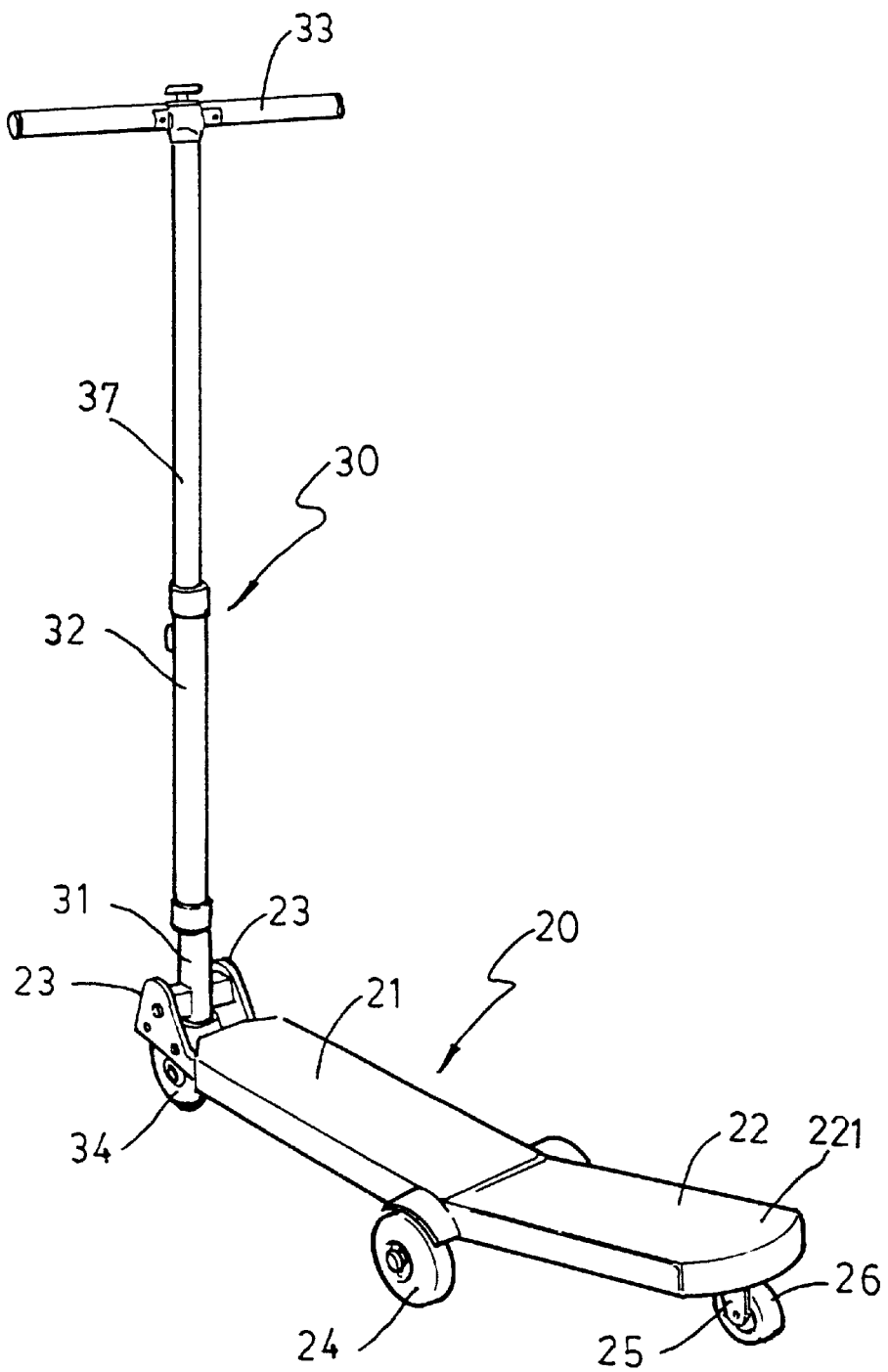
FIG. 1 is an upper perspective view of a scooter in accordance with the present invention.
Figure 2:
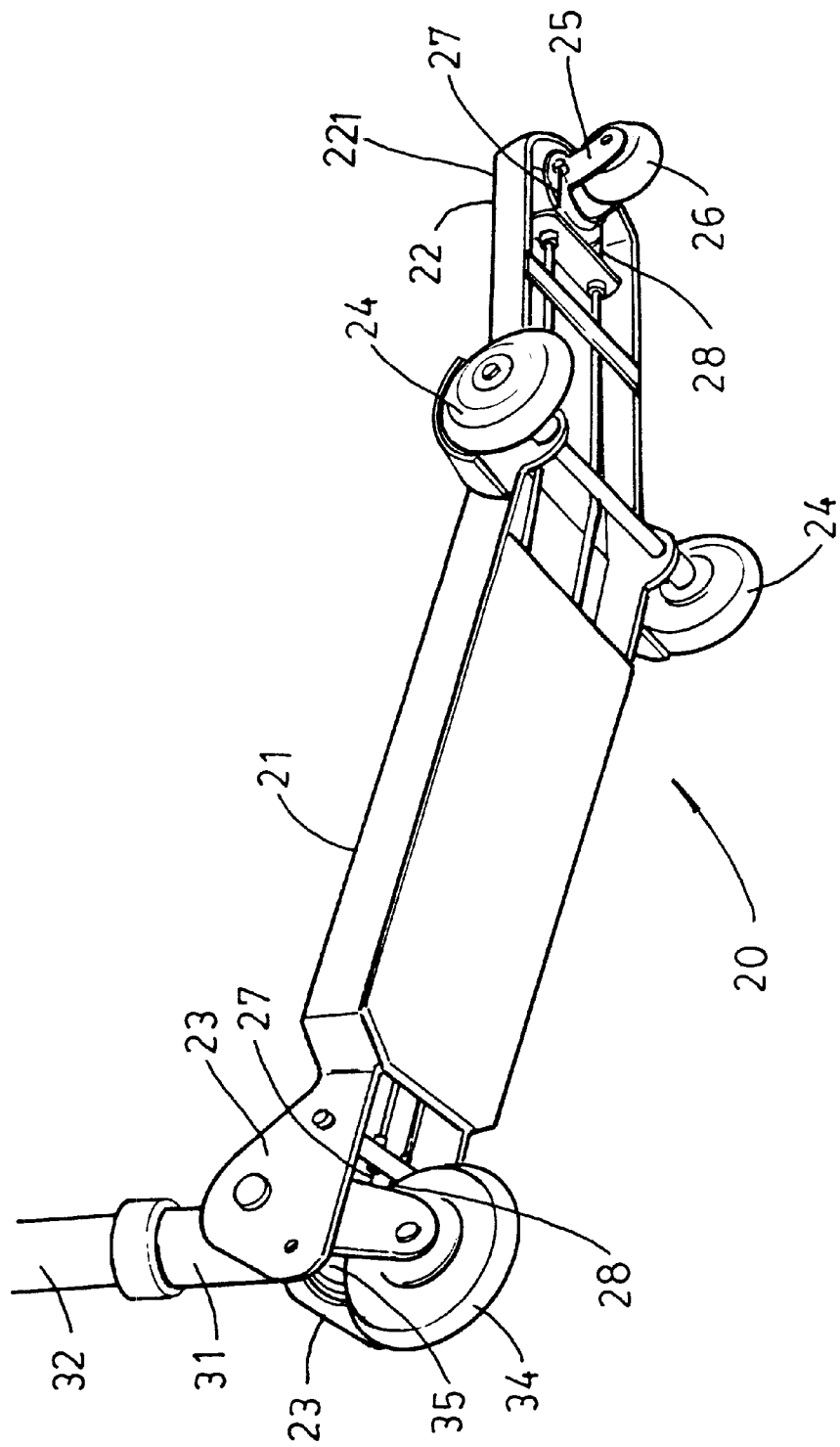
FIG. 2 is a partial bottom perspective view of the scooter.
Figure 3:
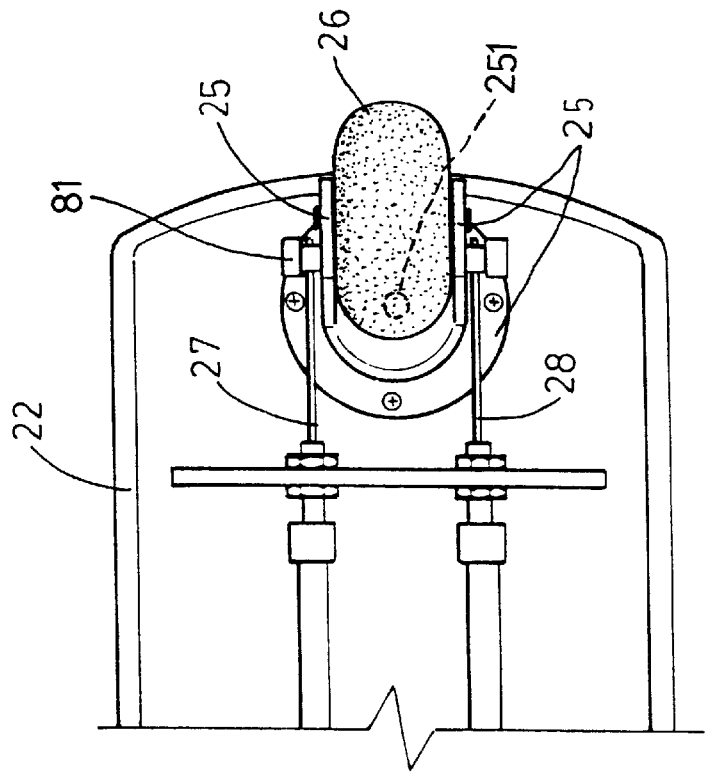
FIGS. 3 and 4 are partial bottom plane views illustrating the operation of the scooter.
Figure 3:
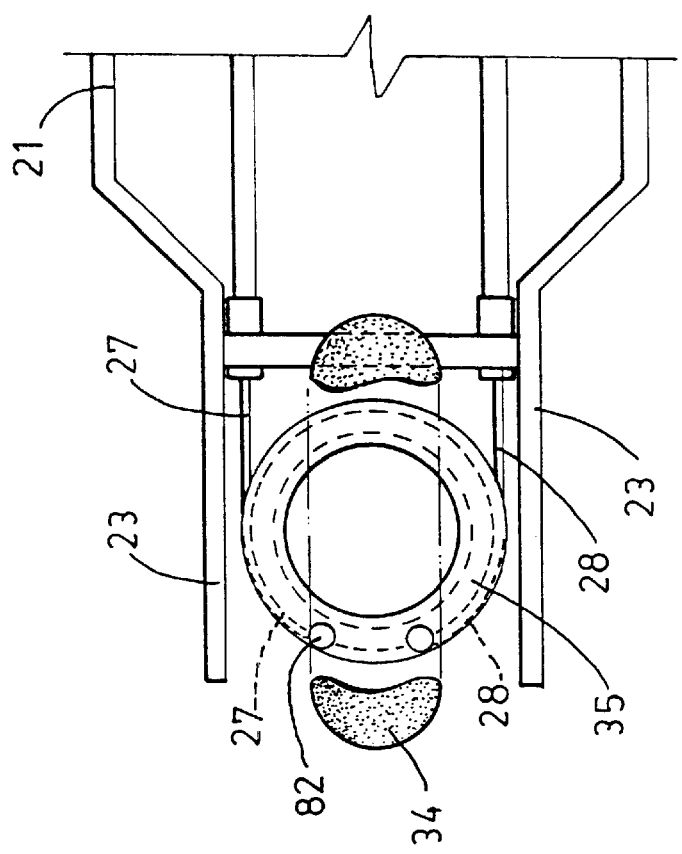
Figure 4:
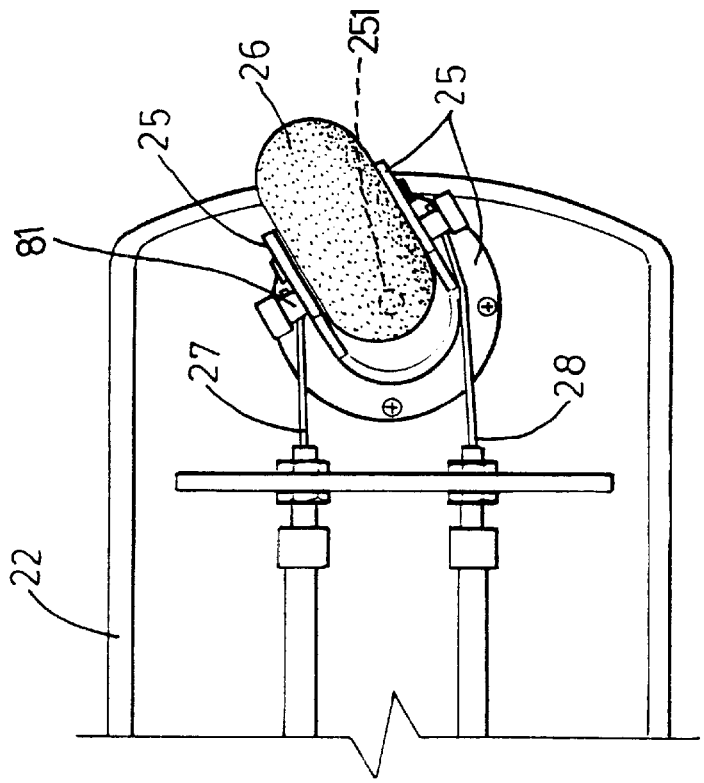
Figure 4:
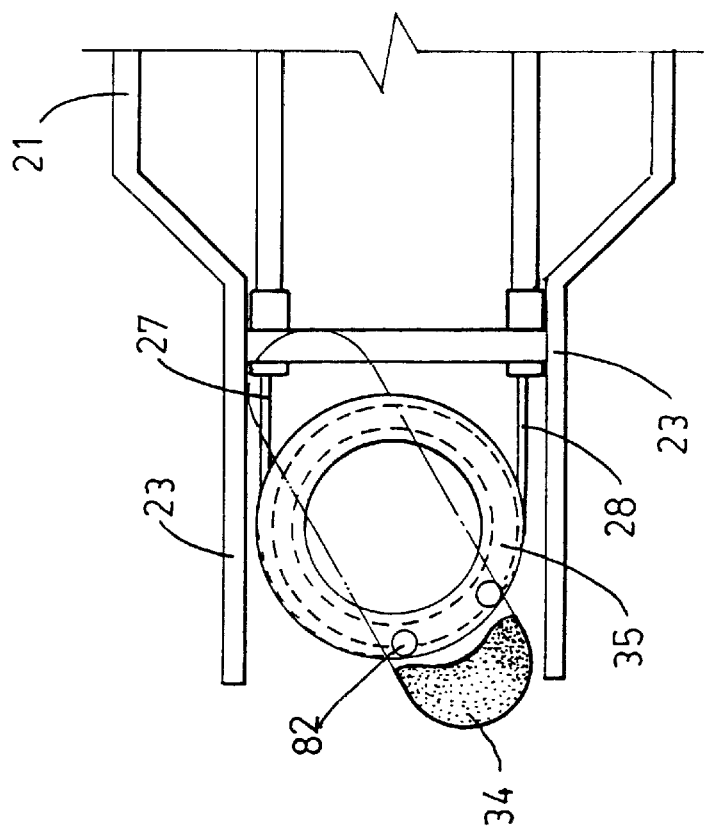
Figure 5:
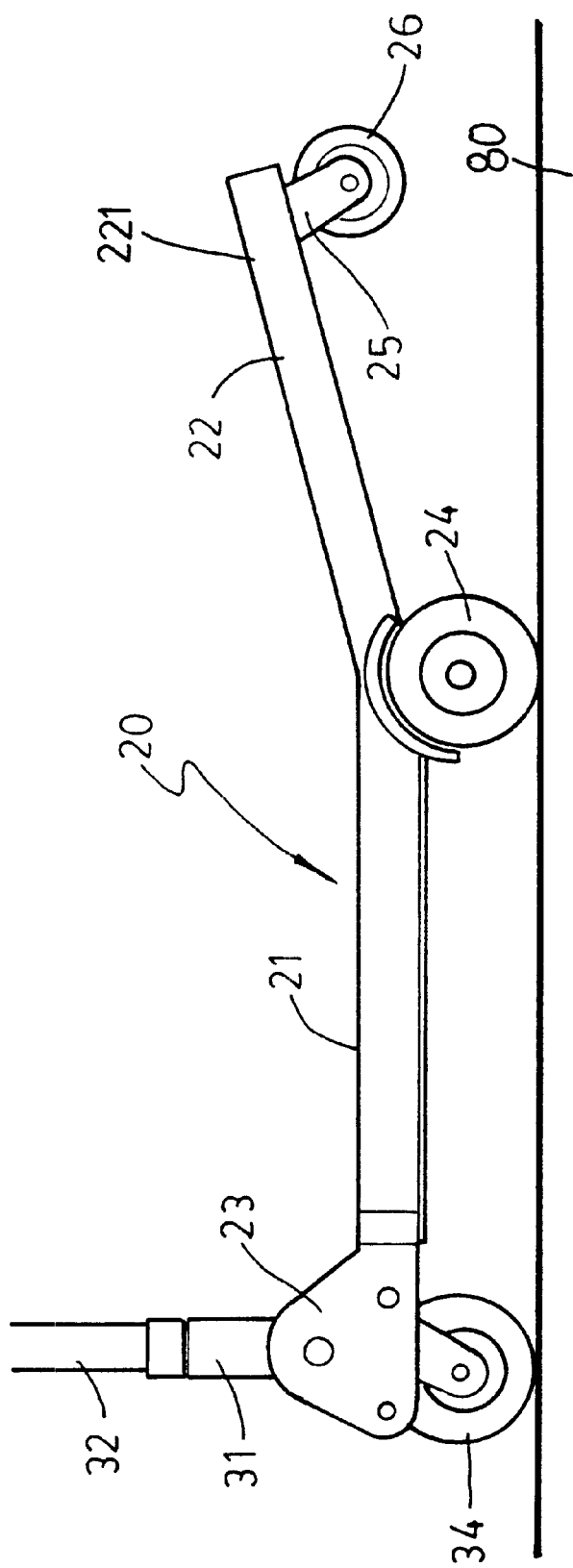
FIGS. 5 and 6 are side elevational views illustrating the operation of the scooter.

Referring to the drawings, and initially to FIGS. 1–5, a scooter in accordance with the present invention comprises a supporting board: device 20 including a first board 21 and a second board 22 extended rearwardly and upwardly from the first board 21 with a suitable inclination, or bent relative to the first board 21 and arranged such that the rear end 221 of the second board 22 is elevated and spaced from the supporting surface or ground 80 when the first board 21 is horizontal to the supporting ground 80 (FIG. 5). The first board 21 includes a front portion having a frame 23 provided thereon, and includes a rear portion having one or more wheels 24 attached thereto, such as the middle wheels 24. One or more further wheels, such as the rear wheels 26 are further provided and attached to a coupler 25 which is rotatably secured to the rear portion of the second board 22 with a pivot shaft 251 (FIGS. 3, 4), such that the wheels 26 may be rotated, together with the coupler 25, about the pivot shaft 251 (FIGS. 3, 4) for steering purposes. The pivot shaft 251 is preferably perpendicular to the second board 22.

A barrel 31 is secured to the front portion of the first board 21, such as secured to the frame 23 and extended upwardly from the first board 21 and is preferably perpendicular to the first board 21. A handle device 30 includes a tube 32 having a lower portion rotatably secured in the barrel 31 for rotatably securing the handle device 30 to the front portion of the first board 21. One or more wheels, such as the front wheels 34 are attached to the bottom of the tube 32 and thus may be rotated about the barrel 31 by the tube 32 for steering purposes. The handle device 30 may include one or more extensions 37 slidably and foldably received in the tube 32 for forming a telescopic structure or a foldable structure. The handle device 30 includes a handle 33 disposed on top of the extensions 37 or directly disposed on top of the tube 32 for rotating the wheels 34 about the barrel 31 and for steering purposes.

In operation, as shown in FIG. 5, when the first board 21 is horizontal having the wheels 34, 24 supported on the ground 80, the front wheels 34 may be rotated by the handle device 30 for steering purposes. At this moment, the rear wheels 26 are elevated or spaced from the ground 80 such that the rear wheels 26 may not be used for steering purposes at this situation.

Figure 6:
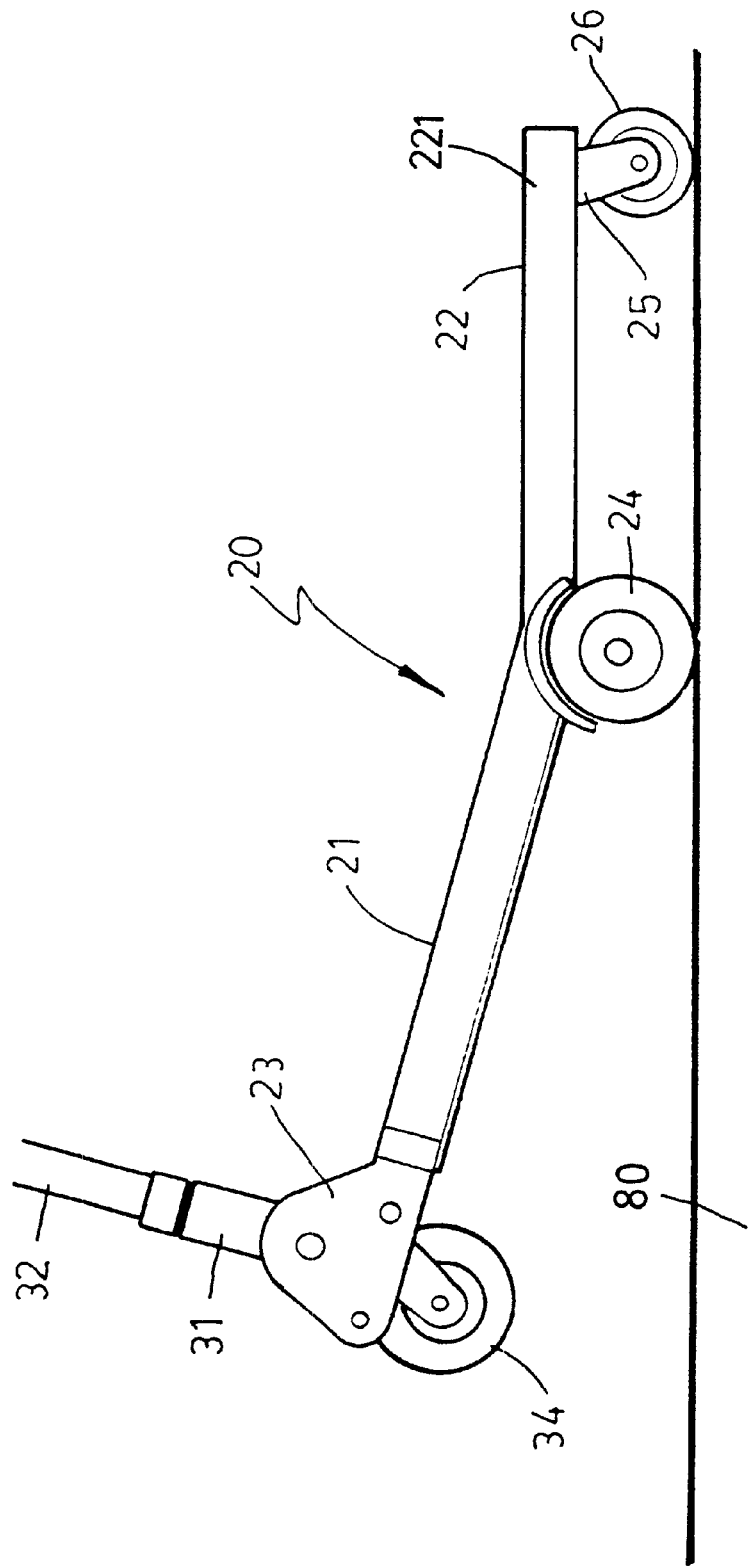

As shown in FIG. 6, when the second board 22 is depressed downwardly to engage the rear wheels 26 with the ground 80, the rear wheels 26 may be rotated about the pivot shaft 251, and the users may swing or vibrate or shake his body in order to rotate the direction of the board device 20 with the rear wheels 26, and for steering purposes.

Referring again to FIGS. 2–4, a pulley 35 is secured to the bottom of the tube 32 and arranged above the front wheel(s) 34, and rotated in concert with the tube 32 such that the pulley 35 may be rotated in concert with the front wheel(s) 34 by the handle device 30. One or more cables 27, 28 have one end secured to the coupler 25 with a fastening member 81, and have the other end engaged with the pulley 35 and secured to the pulley 35 with another fastening member 82, such that the coupler 25 may also be rotated by the handle device 30 via the pulley 35 (FIG. 4) for rotating the rear wheel(s) 26 about the pivot shaft 251 and for steering purposes when the rear wheel(s) 26 are engaged with the ground 80. The cables 27, 28 may be an integral one-piece cable having two ends secured to the coupler 25 and having the middle portion thereof engaged over the pulley 35 and secured to the pulley 35 with the fastening member(s) 82, such that the rear wheel(s) 26 may also be rotated about the pivot shaft 251 by the handle device 30 via the cable(s) 27, 28.

In operation, as shown in FIG. 5, when the front wheel(s) 34 are engaged with the ground 80 and when the rear wheel(2) 26 are elevated and spaced from the ground 80, the user may swing or vibrate or shake his body for steering purposes. The user may also rotate the front wheel(s) 26 by the handle device 30 for steering purposes. As shown in FIG. 6, when the second board 22 is depressed downwardly to engage the rear wheels 26 with the ground 80 and to elevate and to space the front wheel(s) 34 from the ground 80, the users may swing or vibrate or shake his body in order to rotate the rear wheel(s) 26 about the pivot shaft 251 and to rotate the direction of the board device 20 with the rear wheels 26, and for steering purposes.

Accordingly, the scooter in accordance with the present invention includes a changeable steering mechanism for selectively controlling the steering of the scooter with a rotatable front wheel or a rotatable rear wheel. The scooter includes a rear wheel that may be selectively rotated with the handle device for steering purposes when the rear wheel is selectively depressed and engaged with the supporting ground.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:
1. A scooter comprising:
   a) a supporting board device including:
      i) a first board including a front portion and including a rear portion;
      ii) at least one first wheel attached to said rear portion of said first board for engaging with a supporting surface;
      iii) a second board extended rearwardly from said rear portion of said first board and inclined upwardly from said first board;
      iv) a coupler rotatably secured to said second board with a pivot shaft; and
      v) at least one second wheel attached to said coupler and rotated in concert with said coupler about said pivot shaft for engaging with the supporting surface;
   b) a handle device rotatably secured to said front portion of said first board and including a lower portion;
   c) at least one third wheel attached to said lower portion of said handle device and to be rotated by said handle device for engaging with the supporting surface and for steering purposes, and
   d) means for coupling said handle device to said coupler and to rotate said coupler and said at least one second wheel about said pivot shaft,
   said at least one second wheel being elevated and spaced from the supporting surface when said at least one third wheel is engaged with the supporting surface, and said at least one third wheel being elevated and spaced from the supporting surface when said at least one second wheel is engaged with the supporting surface.

2. The scooter according to claim 1, wherein said first board includes a barrel secured to said front portion thereof, said handle device includes a tube rotatably secured in said barrel, said tube includes a lower portion having said at least one third wheel attached thereto.

3. The scooter according to claim 2, wherein said handle device includes at least one extension foldably received in said tube, and a handle secured on top of said at least one extension.

4. The scooter according to claim 1, in said coupling means includes at least one cable coupled between said coupler and said lower portion of said handle device.

5. The scooter according to claim 4, wherein said coupling means includes a pulley secured to said lower portion of said handle device, said at least one cable includes a first end secured to said coupler and includes a second end secured to said pulley.

\* \* \* \* \*